United States Patent
Frodigh

(10) Patent No.: US 11,880,885 B2
(45) Date of Patent: Jan. 23, 2024

(54) COVERAGE DEFINITION SYSTEM AND METHOD

(71) Applicant: Peter T. Frodigh, Westwood, MA (US)

(72) Inventor: Peter T. Frodigh, Westwood, MA (US)

(*) Notice: Subject to any disclaimer, the term of this patent is extended or adjusted under 35 U.S.C. 154(b) by 75 days.

(21) Appl. No.: 17/080,461

(22) Filed: Oct. 26, 2020

(65) Prior Publication Data

US 2021/0125239 A1 Apr. 29, 2021
US 2023/0132376 A9 Apr. 27, 2023

Related U.S. Application Data

(63) Continuation-in-part of application No. 16/996,359, filed on Aug. 18, 2020, now abandoned, which is a
(Continued)

(51) Int. Cl.
| | |
|---|---|
| *G06Q 40/08* | (2012.01) |
| *G06Q 10/10* | (2023.01) |
| *G06Q 30/018* | (2023.01) |
| *G06Q 30/0201* | (2023.01) |
| *G06Q 30/02* | (2023.01) |
| *G07C 5/00* | (2006.01) |
| *G07C 5/04* | (2006.01) |
| *G07C 5/08* | (2006.01) |
| *G06Q 40/03* | (2023.01) |
| *G06Q 10/20* | (2023.01) |

(52) U.S. Cl.
CPC .............. *G06Q 40/08* (2013.01); *G06Q 10/10* (2013.01); *G06Q 30/0185* (2013.01); *G06Q 30/0206* (2013.01); *G06Q 30/0278* (2013.01); *G07C 5/008* (2013.01); *G07C 5/04* (2013.01); *G07C 5/0841* (2013.01); *G06Q 10/20* (2013.01); *G06Q 40/03* (2023.01)

(58) Field of Classification Search
CPC .... G06Q 40/08; G06Q 10/10; G06Q 30/0185; G06Q 30/0206; G06Q 30/0278; G06Q 10/20; G06Q 40/025; G07C 5/008; G07C 5/04; G07C 5/0841
USPC ........................................................ 705/3–44
See application file for complete search history.

(56) References Cited

U.S. PATENT DOCUMENTS

| | | | |
|---|---|---|---|
| 5,507,485 A | 4/1996 | Fisher | |
| 7,596,512 B1 * | 9/2009 | Raines | G06Q 30/02 705/26.4 |

(Continued)

OTHER PUBLICATIONS

"Corner Garage vs Dealer Service Department", These little known bulletins can save you money on repairs, https://www.edmunds.com/car-maintenance/corner-garage-vs-dealer-service-department.html, May 5, 2009.*

(Continued)

*Primary Examiner* — Frantzy Poinvil

(74) *Attorney, Agent, or Firm* — Brian J. Colandreo; Heath M. Sargeant; Holland & Knight LLP

(57) ABSTRACT

A computer-implemented method, computer program product and computing system for determining an initial value for a vehicle prior to the occurrence of a value-reducing event; determining a subsequent value for the vehicle after the occurrence of a value-reducing event; calculating a value reduction for the vehicle based, at least in part, upon the initial value and the subsequent value; and compensating the owner of the vehicle for the value reduction.

21 Claims, 3 Drawing Sheets

Related U.S. Application Data continuation of application No. 16/554,353, filed on Aug. 28, 2019, now abandoned.

(60) Provisional application No. 62/925,493, filed on Oct. 24, 2019, provisional application No. 62/723,671, filed on Aug. 28, 2018.

(56) References Cited

U.S. PATENT DOCUMENTS

| | | | | |
|---|---|---|---|---|
| 7,725,334 | B2 * | 5/2010 | Wahlbin | G06Q 40/08 |
| | | | | 705/4 |
| 7,735,334 | B2 * | 6/2010 | Johnson | F25D 31/006 |
| | | | | 62/457.4 |
| 7,827,099 | B1 * | 11/2010 | Cotton | G06Q 40/03 |
| | | | | 705/38 |
| 8,172,702 | B2 | 5/2012 | Meadows et al. | |
| 8,364,505 | B1 * | 1/2013 | Kane | G06Q 10/10 |
| | | | | 705/400 |
| 8,600,823 | B1 * | 12/2013 | Raines | G06Q 40/04 |
| | | | | 705/26.1 |
| 9,661,894 | B2 | 5/2017 | Niegowski et al. | |
| 10,163,156 | B1 * | 12/2018 | Shapley | G06Q 40/03 |
| 10,679,226 | B1 * | 6/2020 | Duckworth | G06Q 10/30 |
| 10,713,717 | B1 | 7/2020 | Hanson et al. | |
| 10,937,103 | B1 * | 3/2021 | Marlow | G06Q 40/08 |
| 2014/0058956 | A1 * | 2/2014 | Raines | G06Q 30/0201 |
| | | | | 705/306 |
| 2015/0123559 | A1 * | 5/2015 | Kim | H05B 45/00 |
| | | | | 315/250 |
| 2015/0178809 | A1 * | 6/2015 | Scopazzi | G06Q 40/03 |
| | | | | 705/26.63 |
| 2017/0309092 | A1 * | 10/2017 | Rosenbaum | G01M 17/007 |
| 2021/0233164 | A1 * | 7/2021 | Gaur | G06Q 30/0641 |

OTHER PUBLICATIONS

Wai Chen, Shengwei Cai, "Ad Hoc Peer-to-Peer Network Architecture for Vehicle Safety Communications", Telcordia Technologies, Inc., C IEEE Communications Magazine, Apr. 2005.*

Non Final Office Action issued in related U.S. Appl. No. 17/080,536 dated Dec. 24, 2021.

Final Office Action issued in related U.S. Appl. No. 17/080,536 dated Sep. 14, 2022.

* cited by examiner

US 11,880,885 B2

COVERAGE DEFINITION SYSTEM AND METHOD

RELATED APPLICATION(S)

This application claims the benefit of U.S. Provisional Application No. 62/925,493, filed on 24 Oct. 2019, the entire contents of which are incorporated herein by reference.

TECHNICAL FIELD

This disclosure relates to coverage definition systems and, more particularly, to coverage definition systems for use in the insurance space.

BACKGROUND

Various reporting companies provide information concerning the history of a vehicle. One such example is CarFax™, a commercial web-based service that supplies vehicle history reports to individuals and businesses on used cars and light trucks for the American and Canadian consumers.

As is known, what is reported on a vehicle history report can greatly impact the resale value of the vehicle. For example, if the vehicle history report indicates a meticulous vehicle maintenance history, the resale value of the vehicle may be positively impacted. Conversely, if the vehicle history report shows a spotty vehicle maintenance history, the resale value of the vehicle may be negatively impacted. Additionally, other events (such as accidents, odometer discrepancies, flood damage, water damage, hail damage, red flag issues, repair issues, air bag deployments, smoke damage, unibody damage, frame damage, and theft recovery) may adversely impact the resale value of the vehicle. Unfortunately, the occurrence of such a value-reducing event may adversely impact the owner of such a vehicle when they trade it in or sell it.

SUMMARY OF DISCLOSURE

Concept 1

In one implementation, a computer-implemented method is executed on a computing device and includes: determining an initial value for a vehicle prior to the occurrence of a value-reducing event; determining a subsequent value for the vehicle after the occurrence of a value-reducing event; calculating a value reduction for the vehicle based, at least in part, upon the initial value and the subsequent value; and compensating the owner of the vehicle for the value reduction.

One or more of the following features may be included. The value-reducing event may include an accident. The value-reducing event may include one or more of: an odometer discrepancy; missing service records; inaccurate service records; flood damage; water damage; hail damage; red flag issues; and repair issues. The value-reducing event may be reported on a vehicle reporting service. Compensating the owner of the vehicle for the value reduction may include: immediately compensating the owner of the vehicle for all of the value reduction. Compensating the owner of the vehicle for the value reduction may include: immediately compensating the owner of the vehicle for a portion of the value reduction. Compensating the owner of the vehicle for the value reduction may include: subsequently compensating the owner of the vehicle for all of the value reduction. Compensating the owner of the vehicle for the value reduction may include: subsequently compensating the owner of the vehicle for a portion of the value reduction.

In another implementation, a computer program product resides on a computer readable medium and has a plurality of instructions stored on it. When executed by a processor, the instructions cause the processor to perform operations including: determining an initial value for a vehicle prior to the occurrence of a value-reducing event; determining a subsequent value for the vehicle after the occurrence of a value-reducing event; calculating a value reduction for the vehicle based, at least in part, upon the initial value and the subsequent value; and compensating the owner of the vehicle for the value reduction.

One or more of the following features may be included. The value-reducing event may include an accident. The value-reducing event may include one or more of: an odometer discrepancy; missing service records; inaccurate service records; flood damage; water damage; hail damage; red flag issues; and repair issues. The value-reducing event may be reported on a vehicle reporting service. Compensating the owner of the vehicle for the value reduction may include: immediately compensating the owner of the vehicle for all of the value reduction. Compensating the owner of the vehicle for the value reduction may include: immediately compensating the owner of the vehicle for a portion of the value reduction. Compensating the owner of the vehicle for the value reduction may include: subsequently compensating the owner of the vehicle for all of the value reduction. Compensating the owner of the vehicle for the value reduction may include: subsequently compensating the owner of the vehicle for a portion of the value reduction.

In another implementation, a computing system includes a processor and memory is configured to perform operations including: determining an initial value for a vehicle prior to the occurrence of a value-reducing event; determining a subsequent value for the vehicle after the occurrence of a value-reducing event; calculating a value reduction for the vehicle based, at least in part, upon the initial value and the subsequent value; and compensating the owner of the vehicle for the value reduction.

One or more of the following features may be included. The value-reducing event may include an accident. The value-reducing event may include one or more of: an odometer discrepancy; missing service records; inaccurate service records; flood damage; water damage; hail damage; red flag issues; and repair issues. The value-reducing event may be reported on a vehicle reporting service. Compensating the owner of the vehicle for the value reduction may include: immediately compensating the owner of the vehicle for all of the value reduction. Compensating the owner of the vehicle for the value reduction may include: immediately compensating the owner of the vehicle for a portion of the value reduction. Compensating the owner of the vehicle for the value reduction may include: subsequently compensating the owner of the vehicle for all of the value reduction. Compensating the owner of the vehicle for the value reduction may include: subsequently compensating the owner of the vehicle for a portion of the value reduction.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
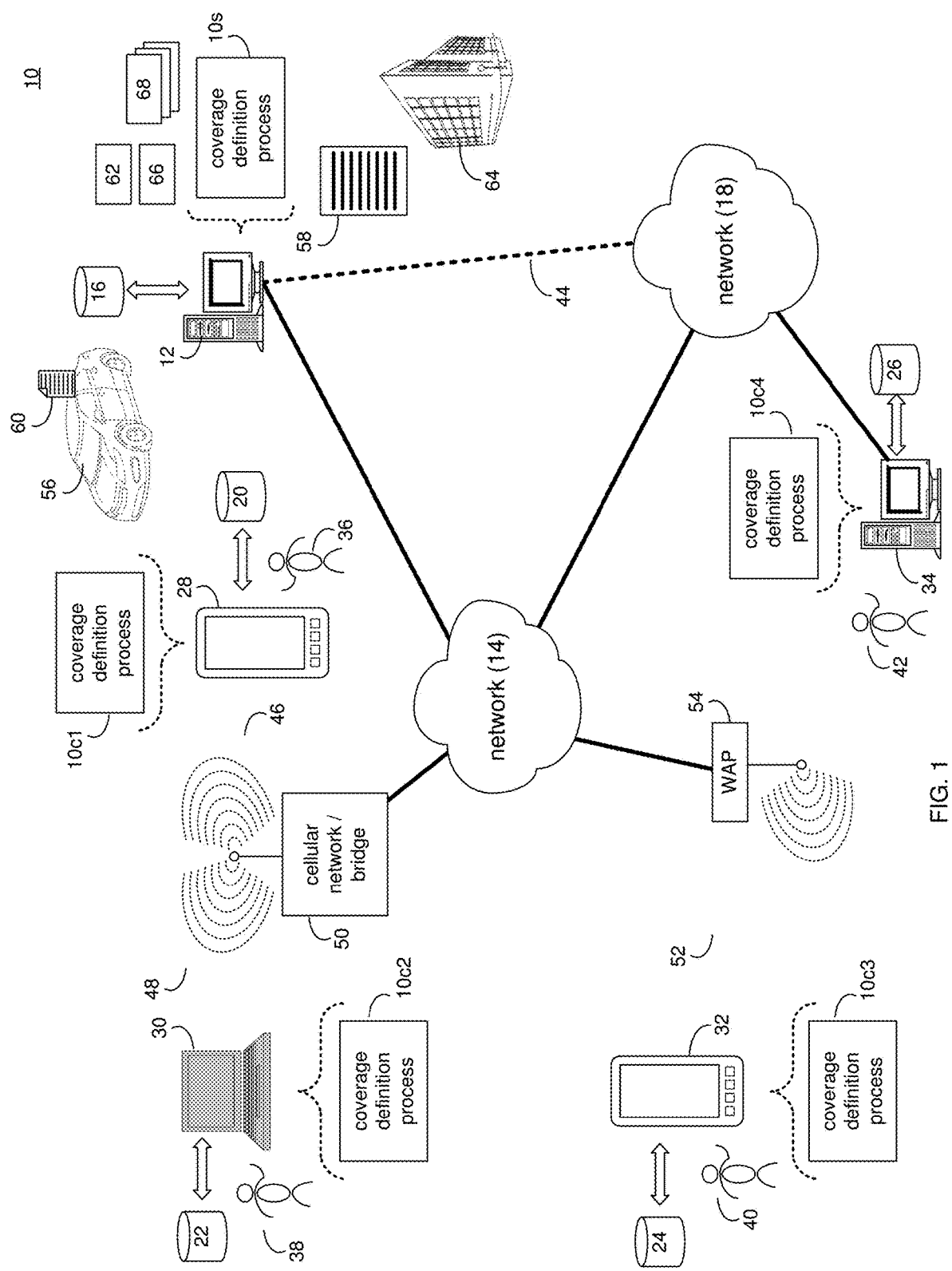
FIG. 1 is a diagrammatic view of a distributed computing network including a computing device that executes a coverage definition process according to an embodiment of the present disclosure.

Referring to FIG. 1, there is shown coverage definition process 10. Coverage definition process 10 may be implemented as a server-side process, a client-side process, or a hybrid server-side/client-side process. For example, coverage definition process 10 may be implemented as a purely server-side process via coverage definition process 10s. Alternatively, coverage definition process 10 may be implemented as a purely client-side process via one or more of coverage definition process 10c1, coverage definition process 10c2, coverage definition process 10c3, and coverage definition process 10c4. Alternatively still, coverage definition process 10 may be implemented as a hybrid server-side/client-side process via coverage definition process 10s in combination with one or more of coverage definition process 10c1, coverage definition process 10c2, coverage definition process 10c3, and coverage definition process 10c4. Accordingly, coverage definition process 10 as used in this disclosure may include any combination of coverage definition process 10s, coverage definition process 10c1, coverage definition process 10c2, coverage definition process 10c3, and coverage definition process 10c4.

Coverage definition process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a cable/satellite receiver with one or more processors embedded therein or coupled thereto, a server computer, a series of server computers, a mini computer, a mainframe computer, or a cloud-based computing network.

The instruction sets and subroutines of coverage definition process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of coverage definition processes 10c1, 10c2, 10c3, 10c4 may include but are not limited to a client application, a web browser, a game console user interface, or a specialized application (e.g., an application running on e.g., the Android™ platform or the iOS™ platform). The instruction sets and subroutines of coverage definition processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage device 16 may include but are not limited to: a hard disk drive; a RAID device; a random access memory (RAM); a read-only memory (ROM); and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a smart television (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access coverage definition process 10 directly through network 14 or through secondary network 18. Further, coverage definition process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. Additionally, personal computer 34 is shown directly coupled to network 18 via a hardwired network connection.

WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Coverage Definition Process

As will be discussed below in greater detail, coverage definition process 10 may be configured to allow an owner (e.g., user 36) of a vehicle (e.g., vehicle 56) to define a new (or configure an existing) insurance policy (e.g., insurance policy 58) to protect user 36 against loss.

As discussed above, there are various reporting companies that provide information concerning the history of a vehicle (e.g., vehicle 56). One such example is CarFax™, a commercial web-based service that supplies vehicle history reports to individuals and businesses on used cars and light trucks for the American and Canadian consumers. As is known, what is reported on a vehicle history report can greatly impact the resale value of the vehicle (e.g., vehicle 56). For example, if the vehicle history report indicates a meticulous vehicle maintenance history, the resale value of the vehicle (e.g., vehicle 56) may be positively impacted. Conversely, if the vehicle history report shows a spotty vehicle maintenance history, the resale value of the vehicle (e.g., vehicle 56) may be negatively impacted. Additionally, other events (such as accidents, odometer discrepancies, flood damage, water damage, hail damage, red flag issues, repair issues, air bag deployments, smoke damage, unibody damage, frame damage, and theft recovery) may adversely impact the resale value of the vehicle (e.g., vehicle 56).

Concept 1

Coverage definition process 10 may be configured to allow an owner (e.g., user 36) of a vehicle (e.g., vehicle 56) to protect themselves against any of the above-described events that may adversely impact the resale value of the vehicle (e.g., vehicle 56). As discussed above, coverage definition process 10 may be configured to allow the owner (e.g., user 36) of a vehicle (e.g., vehicle 56) to define a new (or configure an existing) insurance policy (e.g., insurance policy 58) to protect user 36 against such losses.

For this example, the owner (e.g., user 36) of a vehicle (e.g., vehicle 56) may be any party that has a financial interest in vehicle 36. For example, the owner (e.g., user 36) may be e.g., the purchaser of vehicle 36, the leasor of vehicle 36, the leasee of vehicle 36, the rentor of vehicle 36, the rentee of vehicle 36. the financor of vehicle 36, or the financee of vehicle 36.

Figure 2:
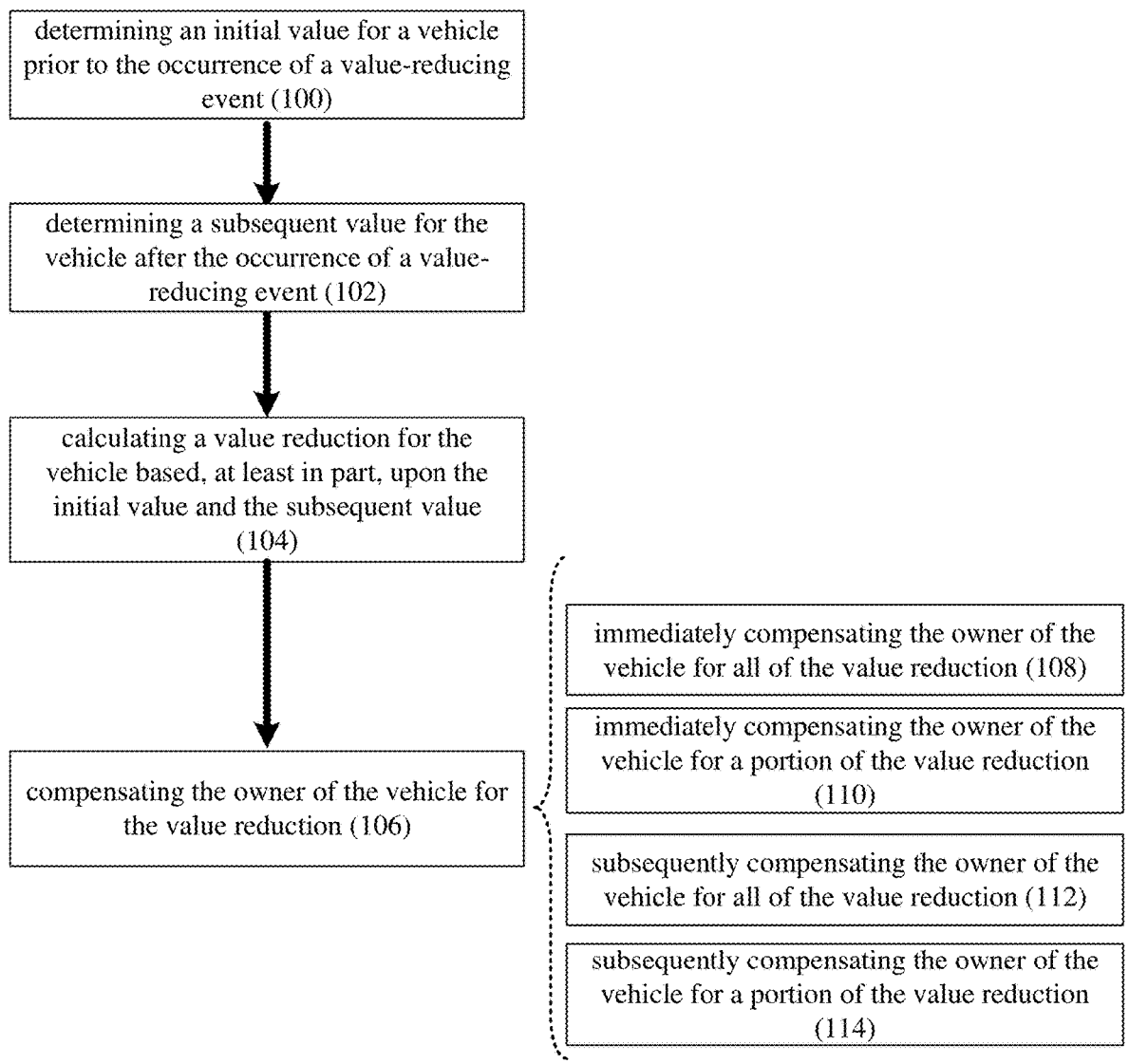
FIG. 2 is a flowchart of an implementation of the coverage definition process of FIG. 1 according to an embodiment of the present disclosure.

Referring also to FIG. 2, coverage definition process 10 may determine 100 an initial value for a vehicle (e.g., vehicle 56) prior to the occurrence of a value-reducing event (e.g., an accident, an odometer discrepancy, missing service records, inaccurate service records, flood damage, water damage, hail damage, a red flag issue, a repair issue, an air bag deployment, smoke damage, unibody damage, frame damage, and a theft recovery). As discussed above, such value-reducing events may be reported on a vehicle reporting service (e.g., CarFax™).

Coverage definition process 10 may determine 102 a subsequent value for the vehicle (e.g., vehicle 56) after the occurrence of a value-reducing event (e.g., an accident, an odometer discrepancy, missing service records, inaccurate service records, flood damage, water damage, hail damage, a red flag issue, a repair issue, an air bag deployment, smoke damage, unibody damage, frame damage, and a theft recovery). Coverage definition process 10 may then calculate 104 a value reduction for the vehicle (e.g., vehicle 56) based, at least in part, upon the initial value and the subsequent value.

For the following example, assume that user 36 purchases vehicle 56 for $50,000 and after two years of ownership, vehicle 56 has depreciated to $30,000. Assume that while driving vehicle 56, user 36 gets into an accident that results in $12,000 in damage to vehicle 56. Further assume that vehicle 56 is fully repaired (e.g., via user 36 making an insurance claim or user 36 paying for the repair out-of-pocket), wherein the occurrence of this accident is defined within a vehicle history report (e.g., vehicle history report 60) associated with vehicle 56. Accordingly and when determining 100 an initial value for vehicle 56 prior to the occurrence of a value-reducing event (e.g., the accident), coverage definition process 10 may determine 100 an initial value of $30,000 for vehicle 56. The initial value of $30,000 for vehicle 56 may be determined 100 by determining the value (e.g., wholesale, dealer resale) of comparables of vehicle 56, namely similar vehicles (e.g., same make/same model/same year) that have similar options/mileage and are in similar condition.

Unfortunately, even though vehicle 56 is fully repaired after the above-described accident, the indication of the accident on the vehicle history report (e.g., vehicle history report 60) associated with vehicle 56 will adversely impact the resale value of vehicle 56. For this example, assume that the resale value of vehicle 56 is now $24,000 due to the above-described accident. Accordingly and when determining 102 a subsequent value for the vehicle (e.g., vehicle 56) after the occurrence of the value-reducing event (e.g., the above-described accident), coverage definition process 10 may determine 102 a subsequent value of $24,000 for vehicle 56. The subsequent value of $24,000 for vehicle 56 may be determined 102 by physically or electronically "shopping" vehicle 56 to e.g., wholesalers/dealers to determine the value (e.g., wholesale, dealer resale) of "post-accident" vehicle 56.

Accordingly and when calculating 104 a value reduction for the vehicle (e.g., vehicle 56) based, at least in part, upon the initial value and the subsequent value, coverage definition process 10 may calculate 104 a value reduction of $6,000 for the vehicle (e.g., vehicle 56) based, at least in part, upon the initial value (e.g., $30,000) and the subsequent value ($24,000).

Once a value reduction (e.g., $6,000) is calculated 104, coverage definition process 10 may compensate 106 the owner (e.g., user 36) of the vehicle (e.g., vehicle 56) for the value reduction (e.g., $6,000). As will be discussed below in greater detail, the manner in which the owner (e.g., user 36) of the vehicle (e.g., vehicle 56) is compensated 106 for the value reduction (e.g., $6,000) may vary depending upon the manner in which the insurance policy (e.g., insurance policy 58) is configured.

Immediate Full Compensation

When compensating 106 the owner (e.g., user 36) of the vehicle (e.g., vehicle 56) for the value reduction (e.g., $6,000), coverage definition process 10 may immediately compensate 108 the owner (e.g., user 36) of the vehicle (e.g., vehicle 56) for all of the value reduction (e.g., $6,000).

Accordingly, coverage definition process 10 may immediately compensate 108 the owner (e.g., user 36) of the vehicle (e.g., vehicle 56) for all of the value reduction (e.g., $6,000) shortly/immediately after vehicle 56 is repaired.

Immediate Partial Compensation

When compensating 106 the owner (e.g., user 36) of the vehicle (e.g., vehicle 56) for the value reduction (e.g., $6,000), coverage definition process 10 may immediately compensate 110 the owner (e.g., user 36) of the vehicle (e.g., vehicle 56) for a portion of the value reduction (e.g., $6,000).

It is foreseeable that the insurance policy (e.g., insurance policy 58) may define a payout period for losses associated with the value-reducing event. An example of such a payout period may be e.g., after the completion of a lease associated with vehicle 56 or after the repayment of a loan associated with vehicle 56. Accordingly and when compensating 106 the owner (e.g., user 36) of the vehicle (e.g., vehicle 56) for the value reduction (e.g., $6,000), coverage definition process 10 may immediately compensate 110 the owner (e.g., user 36) of the vehicle (e.g., vehicle 56) with a payment of $4,200, as e.g., there are five years left on the loan associated with vehicle 56 and (according to time-value-of-money calculations) $6,000 five years from now has a current value of $4,200 today.

Delayed Full Compensation

When compensating 106 the owner (e.g., user 36) of the vehicle (e.g., vehicle 56) for the value reduction (e.g., $6,000), coverage definition process 10 may subsequently compensate 112 the owner (e.g., user 36) of the vehicle (e.g., vehicle 56) for all of the value reduction (e.g., $6,000).

As discussed above, it is foreseeable that the insurance policy (e.g., insurance policy 58) may define a payout period for losses associated with the value-reducing event (e.g., after the completion of a lease associated with vehicle 56 or after the repayment of a loan associated with vehicle 56). Accordingly, coverage definition process 10 may subsequently compensate 112 the owner (e.g., user 36) of the vehicle (e.g., vehicle 56) for all of the value reduction (e.g., $6,000) five years after vehicle 56 is repaired, as there are five years left on the loan associated with vehicle 56.

Delayed Partial Compensation

When compensating 106 the owner (e.g., user 36) of the vehicle (e.g., vehicle 56) for the value reduction (e.g., $6,000), coverage definition process 10 may subsequently compensate 114 the owner (e.g., user 36) of the vehicle (e.g., vehicle 56) for a portion of the value reduction (e.g., $6,000).

As discussed above, it is foreseeable that the insurance policy (e.g., insurance policy 58) may define a payout period for losses associated with the value-reducing event (e.g., after the completion of a lease associated with vehicle 56 or after the repayment of a loan associated with vehicle 56). Accordingly, coverage definition process 10 may subsequently compensate 114 the owner (e.g., user 36) of the vehicle (e.g., vehicle 56) for a portion of the value reduction (e.g., $2,000) five years after vehicle 56 is repaired, as vehicle 56 may have a resale value of $10,000 five years from now and $2,000 is 20% of $10,000 (just as $6,000 is 20% of $30,000).

While the delayed compensations payments are described above as being made in a lump sum, this is for illustrative purposes only and is not intended to be a limitation of this disclosure, as other configurations are possible. For example, it is understood any of the above-described payments may be provided to the owner (e.g., user 36) of the vehicle (e.g., vehicle 56) in an annuitized fashion, wherein such payments may be spread out monthly to offset load/lease payments.

Concept 2

As discussed above, coverage definition process 10 may be configured to allow an owner (e.g., user 36) of a vehicle (e.g., vehicle 56) to protect themselves against any of the above-described events that may adversely impact the resale value of the vehicle (e.g., vehicle 56). Accordingly, coverage definition process 10 may allow the owner (e.g., user 36) of a vehicle (e.g., vehicle 56) to adjust the criteria for deeming vehicle 56 to be a total loss.

Figure 3:
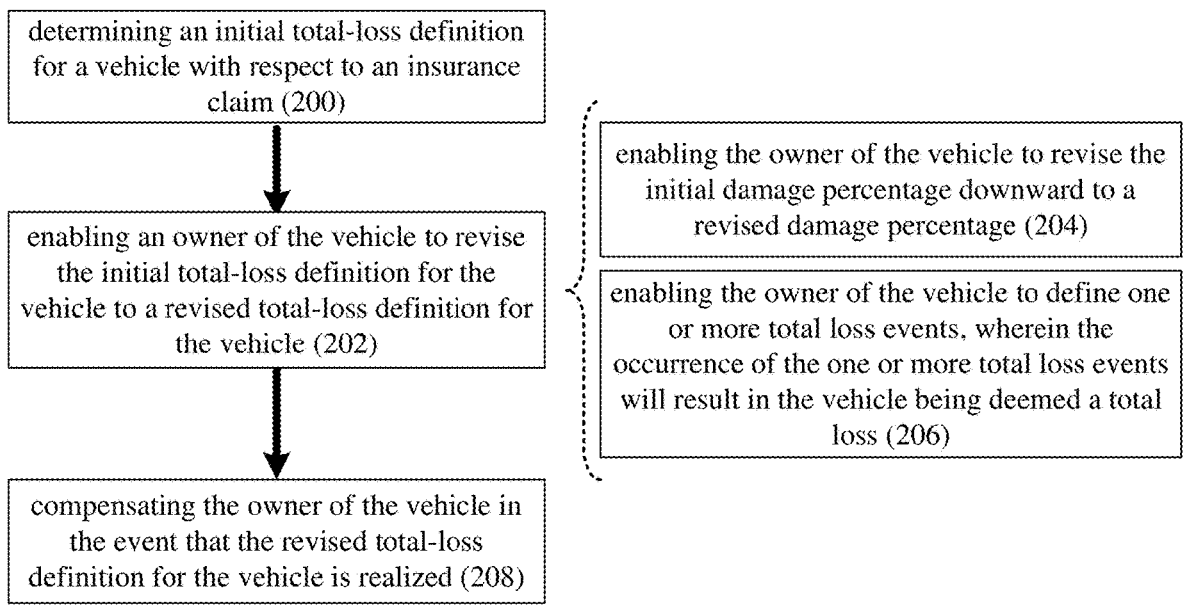
FIG. 3 is a flowchart of another implementation of the coverage definition process of FIG. 1 according to an embodiment of the present disclosure.

Referring also to FIG. 3, coverage definition process 10 may determine 200 an initial total-loss definition (e.g., initial total loss definition 62) for a vehicle (e.g., vehicle 56) with respect to an insurance claim. The initial total-loss definition (e.g., initial total loss definition 62) for the vehicle (e.g., vehicle 56) may be an initial damage percentage, wherein the initial damage percentage may define an initial percentage of the value of the vehicle (e.g., vehicle 56) at which the vehicle (e.g., vehicle 56) will be deemed a total loss.

Typically, an insurance company (e.g., insurance company 64) and/or insurance policy (e.g., insurance policy 58) may define criteria (e.g., initial total loss definition 62) for deeming vehicle 56 to be a total loss. Frequently, this criteria (e.g., initial total loss definition 62) for deeming vehicle 56 to be a total loss is expressed as damage equal to a defined percentage of the value of the vehicle. For example, if the criteria (e.g., initial total loss definition 62) for deeming a vehicle (e.g., vehicle 56) to be a total loss is expressed as damage equal to (or greater than) 70% of the value of the vehicle, vehicle 56 (which has a value $30,000) would be deemed a total loss if involved in an accident resulting in $22,000 in damage (i.e., 73.3% of the value of vehicle 56); but would be deemed repairable if involved in an accident resulting in $20,000 in damage (i.e., 66.7% of the value of vehicle 56).

As discussed above, there are various reporting companies that provide information concerning the history of a vehicle (e.g., vehicle 56), wherein what is reported on a vehicle history report can greatly impact the resale value of the vehicle (e.g., vehicle 56). Accordingly and as discussed above, vehicle 56 being involved in an accident having approximately $20,000 in damage would greatly impact the value of vehicle 56.

In the situation where vehicle 56 (which has a value $30,000) is involved in an accident resulting in $22,000 in damage (i.e., 73.3% of the value of vehicle 56), vehicle 56 would be deemed a total loss and, therefore, any notation on the vehicle history report (e.g., vehicle history report 60) associated with vehicle 56 would not adversely impact the owner (e.g., user 36) of the vehicle (e.g., vehicle 56), as the vehicle is totalled. However and in the situation where vehicle 56 (which has a value $30,000) is involved in an accident resulting in $20,000 in damage (i.e., 66.7% of the value of vehicle 56), vehicle 56 would be deemed repairable and, therefore, any notation on the vehicle history report (e.g., vehicle history report 60) associated with vehicle 56 would adversely impact the owner (e.g., user 36) of the vehicle (e.g., vehicle 56).

Accordingly, coverage definition process 10 may enable 202 an owner (e.g., user 36) of the vehicle (e.g., vehicle 56) to revise the initial total-loss definition (e.g., initial total loss definition 62) for the vehicle (e.g., vehicle 56) to a revised total-loss definition (e.g., revised total loss definition 66) for the vehicle (e.g., vehicle 56). Specifically and when enabling 202 an owner (e.g., user 36) of the vehicle (e.g., vehicle 56) to revise the initial total-loss definition (e.g., initial total loss definition 62) for the vehicle (e.g., vehicle 56) to a revised total-loss definition (e.g., revised total loss definition 66) for the vehicle (e.g., vehicle 56), coverage definition process 10 may enable 204 the owner (e.g., user 36) of the vehicle (e.g., vehicle 56) to revise the initial damage percentage downward to a revised damage percentage.

Accordingly, coverage definition process 10 may enable 204 the owner (e.g., user 36) of the vehicle (e.g., vehicle 56) to revise the initial damage percentage (e.g., 70%) downward to a revised damage percentage (e.g., 40%). In such a situation, if the vehicle (e.g., vehicle 56) is involved in an accident and sustains $13,000 in damage (i.e., 43.3% of the value of vehicle 56), vehicle 56 would be deemed a total loss. Therefore and by enabling 204 the owner (e.g., user 36) of the vehicle (e.g., vehicle 56) to revise the initial damage percentage (e.g., 70%) downward to a revised damage percentage (e.g., 40%), vehicle 56 would be deemed a total loss at a reduced level of damage, thus decreasing the likelihood that the vehicle history report (e.g., vehicle history report 60) associated with vehicle 56 would adversely impact the owner (e.g., user 36) of vehicle 56 (as vehicle 56 would be totaled).

Additionally and when enabling 202 an owner (e.g., user 36) of the vehicle (e.g., vehicle 56) to revise the initial total-loss definition (e.g., initial total loss definition 62) for the vehicle (e.g., vehicle 56) to a revised total-loss definition (e.g., revised total loss definition 66) for the vehicle (e.g., vehicle 56), coverage definition process 10 may enable 206 the owner (e.g., user 36) of the vehicle (e.g., vehicle 56) to define one or more total loss events, wherein the occurrence of the one or more total loss events will result in the vehicle (e.g., vehicle 56) being deemed a total loss.

Examples of these total loss events may include but are not limited to one or more of: air bag deployment, smoke damage, unibody damage, frame damage, flood damage, hail damage, water damage, and theft recovery. Specifically, the notation of any of these total loss events on the vehicle history report (e.g., vehicle history report 60) associated with vehicle 56 would adversely impact the owner (e.g., user 36) of vehicle 56 (as the value of vehicle 56 would be reduced). Accordingly and by enabling 206 the owner (e.g., user 36) of the vehicle (e.g., vehicle 56) to define one or more total loss events, any adverse impact to the owner (e.g., user 36) of vehicle 56 would be prevented, as vehicle 56 would be deemed totaled if one of these total loss events occurred.

Coverage definition process 10 may then compensate 208 the owner (e.g., user 36) of the vehicle (e.g., vehicle 56) in the event that the revised total-loss definition for the vehicle (e.g., vehicle 56) is realized. Accordingly and if the owner (e.g., user 36) of the vehicle (e.g., vehicle 56) revised the initial damage percentage (e.g., 70%) downward to a revised damage percentage (e.g., 40%), vehicle 56 would be deemed a total loss in the event that vehicle 56 was involved in an accident and sustained e.g., $13,000 in damage (i.e., 43.3% of the value of vehicle 56). Further and if the owner (e.g., user 36) of the vehicle (e.g., vehicle 56) defined one or more total loss events (e.g., air bag deployment, smoke damage, unibody damage, frame damage, flood damage, hail damage, water damage, and theft recovery), vehicle 56 would be deemed a total loss if any of these total loss events occurred.

Accordingly and in either of these situations, coverage definition process 10 may compensate 208 the owner (e.g., user 36) of the vehicle (e.g., vehicle 56) in the event that the revised total-loss definition for the vehicle (e.g., vehicle 56) is realized.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    determining an initial value for a vehicle prior to the occurrence of a value-reducing event using a coverage definition process, wherein the value-reducing event includes an accident, wherein determining the initial value for the vehicle prior to the occurrence of the value-reducing event includes determining values for a plurality of similar vehicles, wherein the coverage definition process is a server-side process operating on a server that communicates with a plurality of computing devices over a network connection;
    determining a subsequent value for the vehicle after the occurrence of a value-reducing event using the coverage definition process, wherein the subsequent value for the vehicle includes the value of the vehicle as repaired following the accident, wherein determining the subsequent value for the vehicle after the occurrence of the value-reducing event includes electronically marketing the vehicle to one or more dealers;
    calculating a value reduction for the vehicle based, at least in part, upon the initial value and the subsequent value using the coverage definition process; and
    compensating the owner of the vehicle for the value reduction on a network-connected computing device using the coverage definition process, wherein compensating the owner of the vehicle includes generating a compensation schedule based upon, at least in part, an insurance policy associated with the vehicle, wherein the compensation schedule includes one or more of an immediate full compensation, an immediate partial compensation, a delayed full compensation, and a delayed partial compensation.

2. The computer-implemented method of claim 1 wherein the value-reducing event includes one or more of: an odometer discrepancy; missing service records; inaccurate service records; flood damage; water damage; hail damage; red flag issues; and repair issues.

3. The computer-implemented method of claim 1 wherein the value-reducing event is reported on a vehicle reporting service.

4. The computer-implemented method of claim 1 wherein compensating the owner of the vehicle for the value reduction includes:
    immediately compensating the owner of the vehicle for all of the value reduction.

5. The computer-implemented method of claim 1 wherein compensating the owner of the vehicle for the value reduction includes:
    immediately compensating the owner of the vehicle for a portion of the value reduction.

6. The computer-implemented method of claim 1 wherein compensating the owner of the vehicle for the value reduction includes:
    subsequently compensating the owner of the vehicle for all of the value reduction.

7. The computer-implemented method of claim 1 wherein compensating the owner of the vehicle for the value reduction includes:
    subsequently compensating the owner of the vehicle for a portion of the value reduction.

8. A computer program product residing on a non-transitory computer readable medium having a plurality of instructions stored thereon which, when executed by a processor, cause the processor to perform operations comprising:

determining an initial value for a vehicle prior to the occurrence of a value-reducing event using a coverage definition process, wherein the value-reducing event includes an accident, wherein determining the initial value for the vehicle prior to the occurrence of the value-reducing event includes determining values for a plurality of similar vehicles, wherein the coverage definition process is a server-side process operating on a server that communicates with a plurality of computing devices over a network connection;

determining a subsequent value for the vehicle after the occurrence of a value-reducing event using the coverage definition process, wherein the subsequent value for the vehicle includes the value of the vehicle as repaired following the accident, wherein determining the subsequent value for the vehicle after the occurrence of the value-reducing event includes electronically marketing the vehicle to one or more dealers;

calculating a value reduction for the vehicle based, at least in part, upon the initial value and the subsequent value using the coverage definition process; and compensating the owner of the vehicle for the value reduction on a network-connected computing device using the coverage definition process, wherein compensating the owner of the vehicle includes generating a compensation schedule based upon, at least in part, an insurance policy associated with the vehicle, wherein the compensation schedule includes one or more of an immediate full compensation, an immediate partial compensation, a delayed full compensation, and a delayed partial compensation.

9. The computer program product of claim 8 wherein the value-reducing event includes one or more of: an odometer discrepancy; missing service records; inaccurate service records; flood damage; water damage; hail damage; red flag issues and repair issues.

10. The computer program product of claim 8 wherein the value-reducing event is reported on a vehicle reporting service.

11. The computer program product of claim 8 wherein compensating the owner of the vehicle for the value reduction includes:
    immediately compensating the owner of the vehicle for all of the value reduction.

12. The computer program product of claim 8 wherein compensating the owner of the vehicle for the value reduction includes:
    immediately compensating the owner of the vehicle for a portion of the value reduction.

13. The computer program product of claim 8 wherein compensating the owner of the vehicle for the value reduction includes:
    subsequently compensating the owner of the vehicle for all of the value reduction.

14. The computer program product of claim 8 wherein compensating the owner of the vehicle for the value reduction includes:
    subsequently compensating the owner of the vehicle for a portion of the value reduction.

15. A computing system including a processor and memory configured to perform operations comprising:

determining an initial value for a vehicle prior to the occurrence of a value-reducing event using a coverage definition process, wherein the value-reducing event includes an accident, wherein determining the initial value for the vehicle prior to the occurrence of the value-reducing event includes determining values for a plurality of similar vehicles, wherein the coverage definition process is a server-side process operating on a server that communicates with a plurality of computing devices over a network connection;

determining a subsequent value for the vehicle after the occurrence of a value-reducing event using the coverage definition process, wherein the subsequent value for the vehicle includes the value of the vehicle as repaired following the accident, wherein determining the subsequent value for the vehicle after the occurrence of the value-reducing event includes electronically marketing the vehicle to one or more dealers;

calculating a value reduction for the vehicle based, at least in part, upon the initial value and the subsequent value using the coverage definition process; and compensating the owner of the vehicle for the value reduction on a network-connected computing device using the coverage definition process, wherein compensating the owner of the vehicle includes generating a compensation schedule based upon, at least in part, an insurance policy associated with the vehicle, wherein the compensation schedule includes one or more of an immediate full compensation, an immediate partial compensation, a delayed full compensation, and a delayed partial compensation.

16. The computing system of claim 15 wherein the value-reducing event includes one or more of: an odometer discrepancy; missing service records; inaccurate service records; flood damage; water damage; hail damage; red flag issues and repair issues.

17. The computing system of claim 15 wherein the value-reducing event is reported on a vehicle reporting service.

18. The computing system of claim 15 wherein compensating the owner of the vehicle for the value reduction includes:
    immediately compensating the owner of the vehicle for all of the value reduction.

19. The computing system of claim 15 wherein compensating the owner of the vehicle for the value reduction includes:
    immediately compensating the owner of the vehicle for a portion of the value reduction.

20. The computing system of claim 15 wherein compensating the owner of the vehicle for the value reduction includes:
    subsequently compensating the owner of the vehicle for all of the value reduction.

21. The computing system of claim 15 wherein compensating the owner of the vehicle for the value reduction includes:
    subsequently compensating the owner of the vehicle for a portion of the value reduction.

\* \* \* \* \*